(12) United States Patent
Slaight et al.

(10) Patent No.: US 6,772,253 B1
(45) Date of Patent: Aug. 3, 2004

(54) METHOD AND APPARATUS FOR SHARED SYSTEM COMMUNICATION AND SYSTEM HARDWARE MANAGEMENT COMMUNICATION VIA USB USING A NON-USB COMMUNICATION DEVICE

(75) Inventors: Thomas M. Slaight, Beaverton, OR (US); Thomas W. Erdman, Gig Harbor, WA (US); Robert A. Jacobs, Portland, OR (US); Douglas C. Mason, Olympia, WA (US); Don J. Neuhengen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 09/745,336

(22) Filed: Dec. 20, 2000

(51) Int. Cl.[7] .............................................. G06F 13/42
(52) U.S. Cl. ....................... 710/105; 710/313; 710/315
(58) Field of Search ................................ 710/105, 313, 710/315, 62, 63, 100, 300, 53, 314, 316, 104; 712/35, 36; 713/1; 709/217, 246, 223

(56) References Cited

U.S. PATENT DOCUMENTS

| | | | |
|---|---|---|---|
| 6,088,785 A | * | 7/2000 | Hudson et al. ............... 712/35 |
| 6,205,547 B1 | * | 3/2001 | Davis ............................. 713/1 |
| 6,324,605 B1 | * | 11/2001 | Rafferty et al. ............. 710/100 |
| 6,480,901 B1 | * | 11/2002 | Weber et al. ................ 709/246 |
| 6,549,966 B1 | * | 4/2003 | Dickens ....................... 710/300 |

* cited by examiner

Primary Examiner—Khanh Dang
(74) Attorney, Agent, or Firm—Blakely, Sokoloff, Taylor & Zafman LLP

(57) ABSTRACT

System and method in a USB environment for providing secondary management channel access to a managed system via a communications device connected to the managed system. The communications device can be shared between management channel use and system use. A remote management system can connect directly to the platform management subsystem of the managed system and the channel provides a communications path to the platform management subsystem under conditions where the host processor (s) and system software are unavailable. A management controller simulates the presence of the communication device to the USB host when the management controller takes ownership of the communication device. For non-USB communication devices, the management controller also converts data from non-USB format to USB format and routes the converted data to the USB host.

11 Claims, 5 Drawing Sheets

METHOD AND APPARATUS FOR SHARED SYSTEM COMMUNICATION AND SYSTEM HARDWARE MANAGEMENT COMMUNICATION VIA USB USING A NON-USB COMMUNICATION DEVICE

BACKGROUND OF THE INVENTION

1. Field of the Invention

The invention is related to computers and computer systems, and in particular, to computer system management.

2. Background Information

Many computer systems today communicate remotely via a serial modem connected to the computer system via a serial port. A management controller can access a communication device, such as a modem, through the serial port such that the computer system shares the modem with the management controller. A remote system can initiate communication with the management controller via the modem. The management controller can essentially answer the phone so that the remote system can establish a dialogue with the management controller. When the remote system has finished communicating with the management controller, the remote system can switch the modem to the computer system and then establish a dialogue with the computer system.

The computer system and the management controller cannot both use the modem simultaneously. To accommodate this, the modem is switched between use by the system motherboard's serial controller and the management controller's serial controller using circuitry for switching the signals to the serial connector. This is sometimes referred to as "serial port switching" or "serial port sharing."

There is a transition today towards greater Universal Serial Bus use. A Universal Serial Bus ("USB" or "Bus") is a well-known cable bus that supports data exchange between a computer system's host processor and a wide range of simultaneously accessible peripheral devices, e.g., printers, mice, joysticks, scanners, keyboards, telephones, etc. The attached peripherals share the Bus, which allows the peripheral devices to be attached, configured, used, and detached while the host processor and other peripheral devices are in operation.

One characteristic of USB is that it is a polled bus that periodically polls each peripheral device, to determine whether it is attached, for example. Thus if the modem is switched away from the host computer system's use, the software resident on the host computer system that interacts with the USB system software interprets this as a "detachment" of the modem from the computer system. Moreover, when the modem switches back to the computer system, the computer system's software must "attach" the modem as though the modem were a newly attached device.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
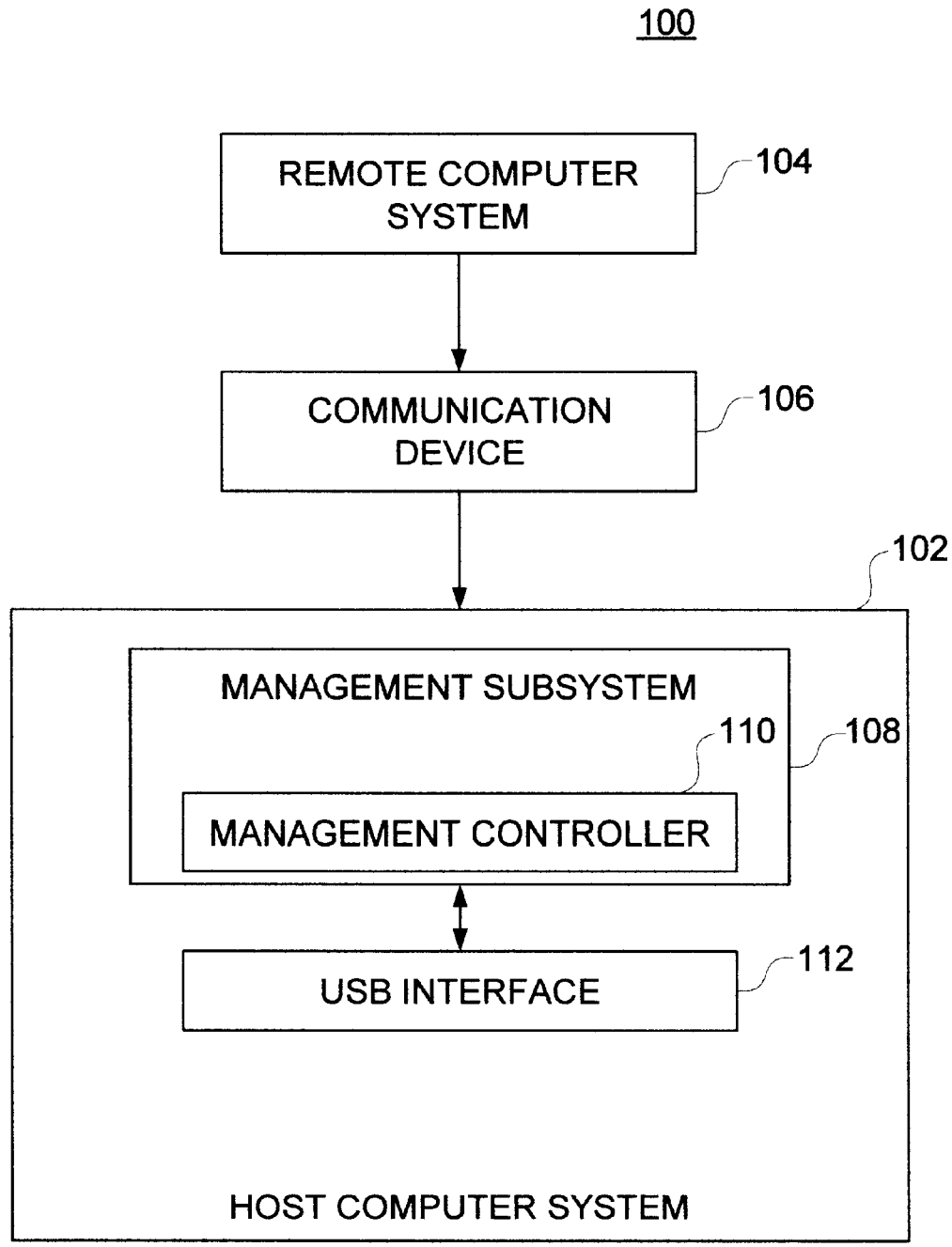
FIG. 1 is a block diagram of an environment suitable for implementing aspects of the present invention.

A method and apparatus for shared system communication and system hardware management communication via Universal Serial Bus (USB) is described herein. In the following description, various aspects of the invention are described. However, it will be apparent to those skilled in the art that the invention may be practiced with only some or all aspects of the invention. For purposes of explanation, specific numbers, methods, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Some parts of the description will be presented using terms such as controller, interface, system management, input, output, and so forth, commonly employed by those skilled in the art to convey the substance of their work to others skilled in the art. Other parts of the description will be presented in terms of operations performed by a computer system, using terms such as triggering, snooping, converting, configuring, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

One aspect of the present invention allows a communication device to be shared between a USB host computer system's management subsystem and host computer system use. In one embodiment present invention, the management subsystem routes data between the communication device and the host computer system.

Another aspect of the present invention triggers a switching function that causes the management subsystem to switch between normal communication mode, where data is routed between the communication device and the host computer system, and a management mode, where routing of data between the communication device and the host computer system is dynamically controlled by the management subsystem. In one embodiment, the management controller monitors (snoops) the communication device's data stream for a unique data sequence indicating that the data is designated for the management subsystem. When the management subsystem detects the unique data sequence, the management subsystem intercepts the data stream and takes control over the communication device.

Conventionally, USB is not intrinsically designed to support sharing in this manner. In still another aspect of the present invention, however, when the management controller has control over the communication device, the management subsystem simulates to the host computer system that the communication device is still attached to the USB. This is advantageous because when the communication device's data stream has been interrupted, the host computer system normally determines that the communication device has been detached from the USB. This is because the host computer system no longer can access the communication device with well-known periodic USB presence and/or configuration queries. Accordingly, in one embodiment, the management subsystem continues to respond to periodic USB presence and/or configuration queries.

FIG. 1 is a block diagram of an environment 100 suitable for implementing aspects of the present invention. The environment 100 includes host computer system 102, a remote computer system 104, and a communication device 106. The host computer system 102 includes a management subsystem 108, which includes a management controller 110. The host computer system 102 also includes a USB interface 112.

In one embodiment of the present invention, the management controller 110 shares the communication device 106 with the host computer system 102. In this embodiment, the management controller 110 can receive and monitor traffic over the USB interface 112 so that the remote computer system 104 can communicate with the management controller 110 through the communication device 106.

The host computer system (or "host") 102 is typically a managed computer system that supports a high-performance desktop, a workstation, a server, etc. The host computer system 102 typically includes the host hardware platform (e.g., processor, bus, etc.) and the operating system in use. In one embodiment, the host computer system 102 uses a UNIX platform and operating system. In other embodiments, the host computer system 102 may use Windows® or Windows® NT platform and operating system. Those skilled in the art will appreciate that a variety of platforms and operating systems may be used when implementing the present invention.

The host computer system 102 is a USB equipped computer (e.g., processor, bus, memory, etc.) and typically detects the attachment and removal of devices from the Bus. The host computer system 102 manages the control flow and data flow to and from the devices, collects status and activity statistics, and provides power to attached devices. USB hosts are defined in the "Universal Serial Bus Specification Rev. 1.1," which is well known.

The remote computer system 104 can establish and maintain communication with the management controller 110 to check on the health of the host computer system 102, for example. The remote computer system 104 is typically, but not necessarily, a workstation that allows remote management of the host computer system 102. The remote computer system 104 in many instances can turn the host computer system 102 "on" and "off" and/or reset the host computer system 102. In one embodiment, the remote computer system 104 uses Windows® or Windows® NT platform and operating system.

The communication device 106 can be any of various well-known devices. In one embodiment, the communication device 106 is a well-known RS-232 serial modem. In another embodiment, the communication device 106 is a well-known TIA-602 modem.

In still another embodiment, the communication device 106 is a USB device. As used herein, a "USB device" refers to a (peripheral) device that is compatible with the well-known "Universal Serial Bus Class Definitions for Communication Devices Standard." Such USB devices include printers, mice, joysticks, scanners, keyboards, telephones, etc., and are detected and configured automatically as soon as they are attached to the Bus.

The management subsystem 108 is hardware and/or firmware that provides health monitoring, inventory and asset management, recovery control, and other management functions for the host computer system 102. The management subsystem 108 is described in more detail below.

The management controller 110 is hardware and/or firmware that monitors the health of the host computer system 102 and has sensors for monitoring temperatures, voltages, fans, etc., If the management controller 110 senses that one or more parameters are out of the ordinary, the management controller 110 can take control of the communication device 106 from the host computer system 102 and transmit an alert to the remote computer system 104. The management controller 110 may be an application specific integrated circuit (ASIC), a microcontoller, etc.

Additionally, the remote computer system 104 can initiate communication with the management controller 110. For example, the remote computer system 104 can call in to the management controller 110 over the communication device 106 and query the management controller 110 directly without going through the host computer system 102. In this embodiment, the management controller 110 essentially answers the phone so that remote computer system 104 can establish a dialogue with the host computer system 102 and query the host computer system 102's health. If the host computer system 102 is healthy, the remote computer system 104 can release the communication device 106 back to the host computer system 102.

In another embodiment, the remote computer system 104 is directly connected to the serial connection (not shown) for the host computer system 102 without going through a modem. The management controller 110 responds to the initial protocol for establishing communication with the host computer system 102, using, for example, the Point-to-Point Protocol (PPP) commonly used for serial communications.

The USB interface 112 is the interface that allows the host computer system 102 to interact with attached devices. In one embodiment, the USB interface 112 is a well-known USB root hub, whose purpose is to provide the electrical interface between USB devices and a USB host. In the embodiment shown in FIG. 1, the USB interface 112 provides the electrical interface between the management controller 110 (acting as a USB device) and a host processor (not shown) in the host computer system 102.

The environment 100 allows the management controller 110 to receive and monitor traffic over the USB interface 112 so that the remote computer system 104 can communicate with the management controller 110 via the communication device 106. The management controller 110 simulates the communication device 106 such that the host computer system 102 operates as if it still has the communication device 106 attached.

Figure 2:
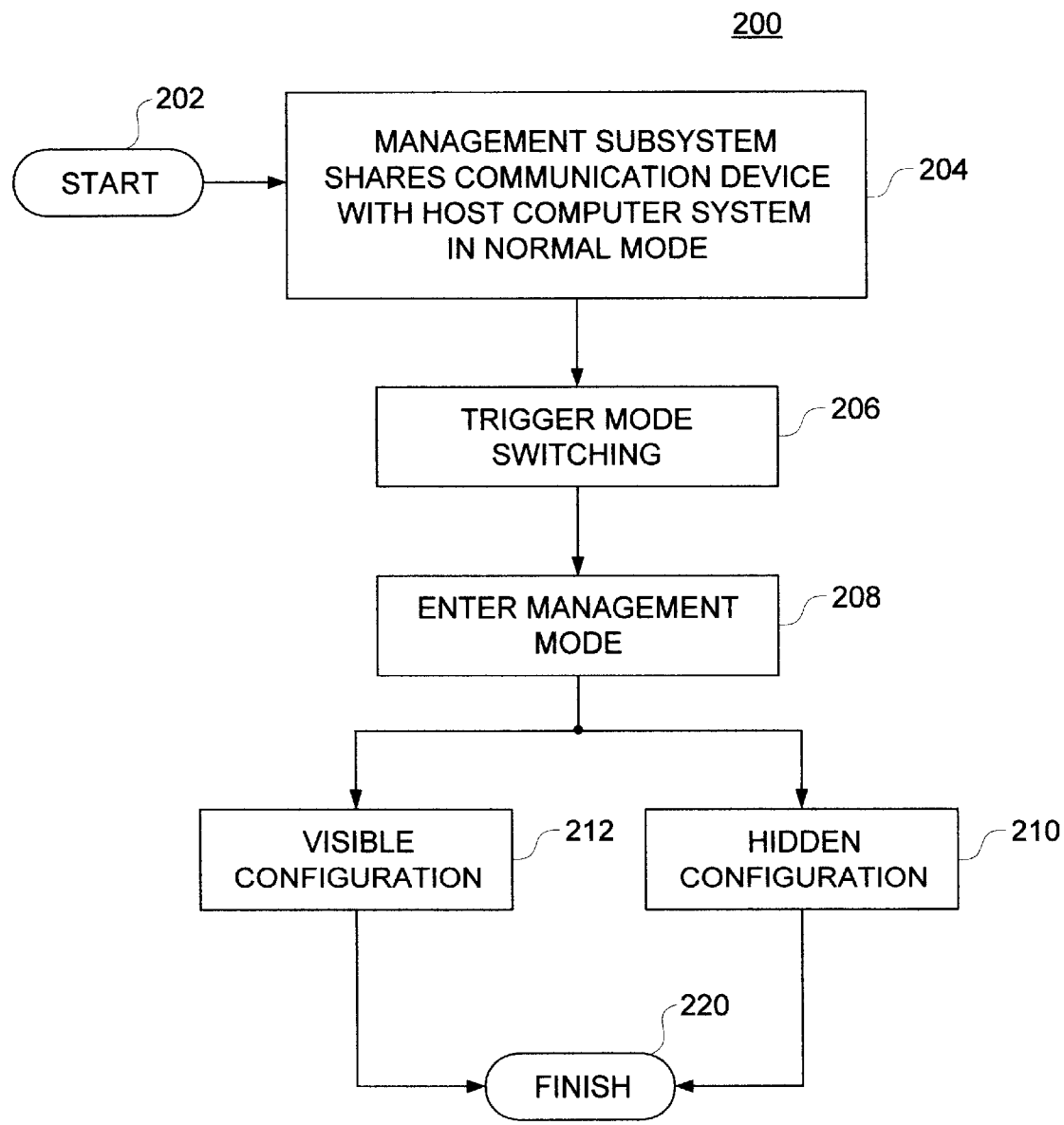
FIG. 2 is a more detailed block diagram of the environment in FIG. 1.

FIG. 2 is a method 200 of an example approach to sharing the communication device 106 between management subsystem 108 use and host computer system 102 use. According to aspects of the present invention, the management subsystem 108 can operate in "normal mode" or "management mode." In normal mode, data passes between the host computer system 102 and the communication device 106 substantially unimpeded by the management subsystem 108. Data from the communication device 106 is routed to the USB interface 112 and the host computer system 102's software, basic input/output system (BIOS), etc., can access the communication device 106.

In management mode, the management controller 110 controls whether data passes from the communication device 106 to the USB interface 112 or is intercepted. For example, when the management controller 110 is in "hidden" configuration, data is intercepted. As a result, data is not routed to the USB interface 112 and the host computer system 102's software, basic input/output system (BIOS), etc., cannot access the communication device 106. When the management controller 110 is in "visible" configuration, data is routed between the USB interface 112 and the management subsystem 108. As such, the host computer system 102's software, basic input/output system (BIOS), etc., are permitted to access the communication device 106 and share such access with the management subsystem 108.

The physical communication device, 106, is represented to the system software as a 'logical' USB communication device that is access using specified commands and protocols delivered via USB. The management controller "visible" configuration can be embodied by the management controller 110 as a USB device that is separate from the communication device 106, or as an extension of the logical communication device. The management controller 110 simulates the logical interface to the communication device 106. >>

The method 200 begins with step 202, where control immediately passes to step 204. In step 204, the management subsystem 108 shares the communication device 106 with the host computer system 102 in "normal mode." In step 206, mode switching is triggered. In step 208, the host computer system 102 enters management mode and the management subsystem 108 takes control over the communication device 106. In step 210, the management controller 110 operates in hidden configuration and prevents access to the communication device 106 by the host computer system 102. In step 212, the management controller 110 operates in visible configuration and allows the host computer system 102 and the management subsystem 108 to share use of the communication device 106. The method 200 finishes in step 220.

In one embodiment, the management controller 110 is always visible as a separate device on USB. In another embodiment, the interface for the management controller 110 is always visible via a non-USB interface in the host computer system 102, such as a set of I/O ports. >>

Figure 3:
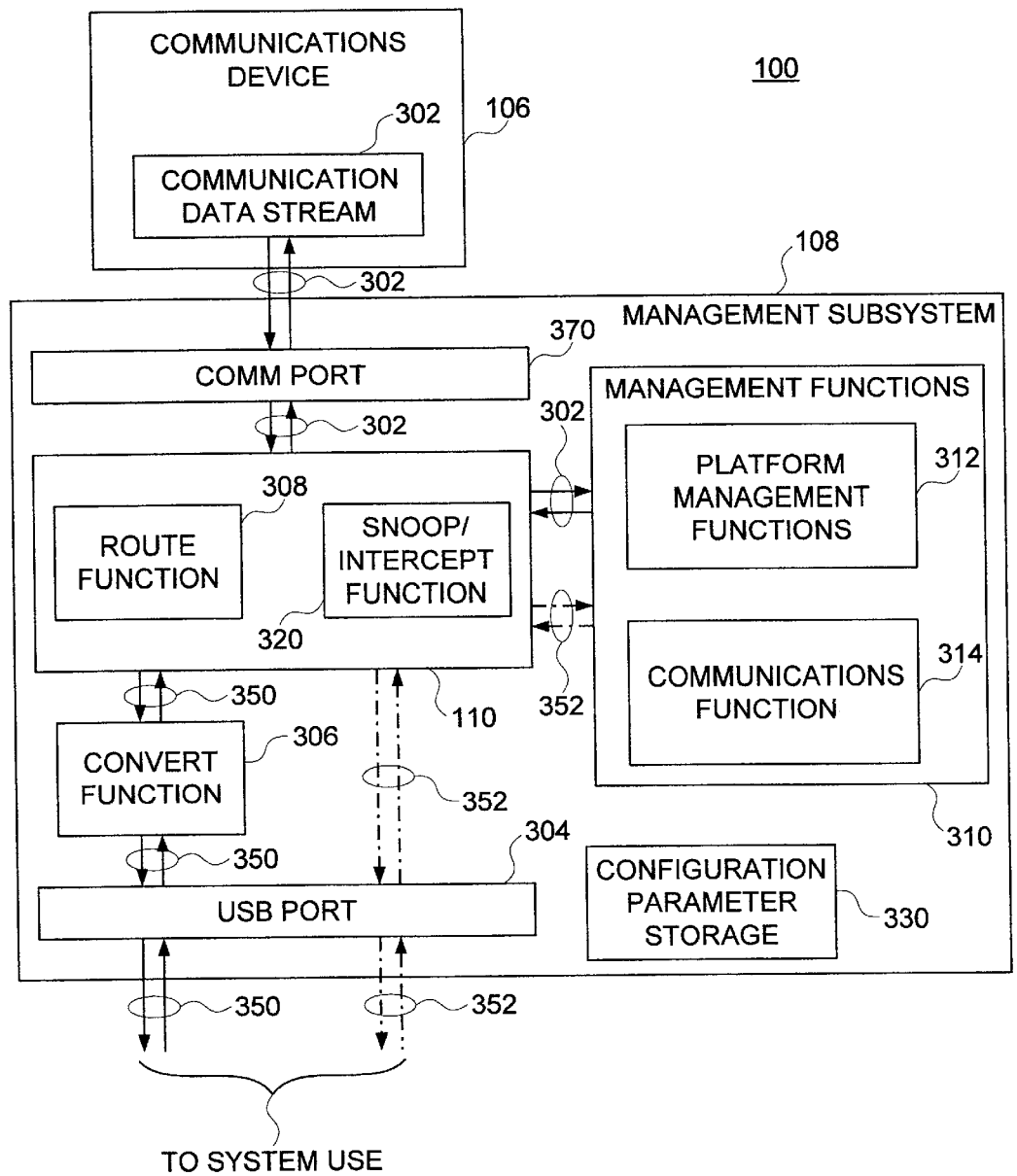
FIG. 3 is a block diagram of the environment in FIG. 1 that depicts the management subsystem functionalities in more detail.

FIG. 3 shows relationships between some of the components and functionalities in the environment 100. Although many of the functionalities are depicted as separate functionalities or groups of functionalities, it is to be understood that no particular grouping of functionalities is required by the present invention. Any, all, or any combination thereof of the functionalities shown in FIG. 3 may be included in one or more functional entities, e.g., ASIC, microcontroller, etc. Moreover, many of the functionalities may be part of the management controller 110, although not so depicted.

FIG. 3 shows the communication device 106 with a communication data stream 302, which can be a USB "data stream." A USB data stream is data that has no USB-defined structure or format. The communication data stream 302 may also be a "message," which is data that has USB-defined structure or format.

If the communication data stream 302 is not in USB format, the management subsystem 108 converts the communication data stream 302 into USB format and passes the converted communication data stream 302 to a USB port 304. As is well known, a USB port is the point where a USB device is attached.

If the communication data stream 302 is in USB format, the management subsystem 108 converts the communication data stream 302 into non-USB format for routing within the management subsystem 108 and for accessing the management functions 310. In one embodiment, a convert function 306 is logic or circuitry (e.g., hardware, firmware, etc.) that allows the management subsystem 108 to convert the communication data stream 302 to/from USB format for internal routing and use and, in one embodiment, to support a non-USB communication device.

A route function 308 can be thought of a "switch" that switches the host computer system 102's operation from management use to system use. The route function 308 is logic or circuitry (e.g., hardware, firmware, etc.) that allows the management subsystem 108 to configure the routing of the communication data stream 302 between the USB port 304, the communication device 106, and management functions 310.

Initially, data is routed from the communication device 106 through the management controller 10 and on to host computer system 102's use via the USB port 304. The route function 308 routes the communication data stream 302 between the communication device 106 and the convert function 304 or between the communication device 106 and management functions 310. In normal mode, the route function 308 routes the communication data stream 302 to the convert function 306 and on to the USB port 304, which sends the communication data stream 302 on for system use. In management mode, the route function 304 routes the communication data stream 302 to the management functions 310 for management use.

The management functions 310 include platform management functions 312 and a communications function 314. The platform management functions 220 has logic or circuitry (e.g., hardware, firmware, etc.) that typically provides functions for remote monitoring of the computer system 102's hardware health, such as monitoring system temperatures, cooling devices, and internal operating voltages and access to failure logs. The platform management functions 220 also typically include functions for remote maintenance and recovery control, including system power on/off, reset, wake, and boot. Lastly, the platform management functions 220 include information to identify the system and provide an inventory of major replaceable components by providing product data such as serial numbers, model name, and asset numbers The communications function 314 is logic or circuitry (e.g., hardware, firmware, etc.) that is used to provide access to the platform management functions 220 from the communication data stream 302 and the communication path 352.

A snoop/intercept function 320 can trigger the route function 308. When the snoop/intercept function 320 triggers the route function 308, operation switches from normal mode to management mode, and vice versa. In one embodiment, the snoop/intercept function 320 is logic or circuitry (e.g., hardware, firmware, etc.) that allows the management functions 310 to monitor the communication data stream 302 for patterns. Snooping would typically occur without impeding or interfering with the communication data stream 302.

The snoop/intercept function 320 can also extract or "strip off" particular patterns in the communication data stream 302 on their way to being routed to their destination. The intercepted communication data stream 302 can be interpreted by the management functions 310 to direct the switching between normal mode and management mode. The intercepted communication data stream 302 also can allow other communications to the management functions 310 to be interleaved in the communications stream to the USB port 304.

Patterns in the communication data stream 302 can be used to cause switching from normal mode and management mode, and vice versa. The snoop/intercept function 320 monitors the communication data stream 302 for patterns and extract those portions of the communication data stream 302 for interpretation by the management functions 310. When the communication device 106 is an RS-232 serial modem, a well-known character "escape sequence" directs mode switching. When the character "escape sequence" is detected, the communication data stream 302 switches from being routed to the USB port 304 to being routed to the management functions 310. In one embodiment, the "escape sequence" can be delivered in the communication stream 302 from the communication device 106 or in the communication stream350 from the host computer system 102.

In another embodiment, packet-based messages are used to direct switching from the management subsystem 108 to the USB port 304. This can be accomplished by defining a packet format on top of the well-known RS-232 asynchronous transport. All or part of a packet can be defined to operate as the "escape sequence" for directing switching between the management subsystem 108 and the USB port 304.

In still another embodiment, switching between management mode and normal mode may be accomplished via changes in the communication that are communicated to the management subsystem 108. When the communication device 106 is a modem, this includes changes in the state of modem signals and state such as Carrier Detect and Ring Indicate signals, Off Hook and Connect, etc.

In a fourth embodiment, switching between management mode and normal mode may be accomplished via changes the "system state" that are monitored by the management controller 110. System state changes include changes to the host computer system 102's power state (e.g. powered-up, powered-down, sleep), soft and hard-resets, transitions to pre-boot and boot states, the loading and unloading of host computer system 102's software, host computer system 102's software detected events, detection of host computer system 102's operating system hang via a watchdog timer, etc.

The snoop/intercept function 320 can also determine whether the management controller 110 operates in hidden configuration or visible configuration. The snoop/intercept function 320 looks for patterns, a unique data sequence, etc., in the communications data stream 302. If the pattern, sequence, etc., indicates to the management controller 110 that the data stream is intended for use by the management subsystem 108, the management controller 110 enters hidden configuration. Conversely, if the pattern, sequence, etc., indicates to the management controller 110 that the data stream is to be shared by the management subsystem 108 and the host computer system 102 via the USB port 304, the management controller 110 enters visible configuration. In essence, this is similar to providing the host computer system 102 with a "key" or "password" where you the host computer system 102 has no visibility to any of the other management functions until after the management controller 110 has receive the correct value representing the key or password.

Once the snoop/intercept function 320 triggers the route function 308 and the route function 308 switches control of the communication device 106 from system use to management use, the management controller 110 has logic or circuitry (e.g., hardware, firmware, etc.) that keeps the communication device 106 switched over to the management functions 310 using "proxy presence." Proxy presence simulates the presence of the communication device 106 on the Universal Serial Bus so that the host computer system 102's processor does not interpret the loss of control as a "detachment."

During proxy presence and on behalf of the communication device 106 the management controller 110 continues to respond to the host computer system 102's "control requests," "configuration requests," "status requests," and other requests in the control and status stream, as defined in the Universal Serial Bus Specification Rev. 1.1. The management controller 110 may also respond to the communications data stream 302 with dummy data.

Also during proxy presence, the management controller 110 appears to be a USB device to the host computer system 102. When the communication device 106 is not a USB device, the management controller 110 also makes the communication device 106 appear to be a USB device to the host computer system 102.

The management subsystem 108 can be pre-configured to support a particular type of communication device 106. Alternatively, the management subsystem 108 can contain configurable parameters that customize its operation to a particular communication device, e.g., a TIA-602 modem.

A configuration parameter storage 330 stores information used to pre-configure the management controller 110 for presence proxy support. Such information includes endpoint (s), transfer type(s), transfer period(s), data size(s), etc. The configuration parameter storage 330 can be a lookup table in nonvolatile random access memory (RAM) or other suitable memory. The configuration parameter storage 330 can also used to store information about the communication device 106, such as bit rate settings, communication device type, etc.

The communication device 106 has a set of USB-defined endpoints. The management controller 110 sits at the endpoints and either allows the communication data stream 302 to pass through to the communication device 106 or intercepts the communication data stream 302. In normal mode, the communication data stream 302 can flow bi-directionally between the communication device 106 and the host computer system 102. In management mode, the communication data stream 302 can flow bi-directionally between the communication device 106 and the management controller 110, as well as bi-directionally between the communication device 106 and the host computer system 102.

In one embodiment, the communications device 106 is a USB device. The control and status communications 352 and the communication data stream 302 are USB communications to and from the host computer system 102. The communication path 352 represents USB control and status communications.

In another embodiment, the communication device 106 is a non-USB device. The communication data stream 302 is converted to USB format to and from the host computer system 102 by the convert function 306 and the communications function 314 in the management functions 312. The communication path 352 represents USB control and status communications.

In one embodiment, the convert function 306 in conjunction with the communications function 314 ensures that the management controller 110 continues to respond to requests to USB control/status "endpoint 0". As a result, the communications device 106 does not get removed from the USB device list because the management controller 110 responds to USB presence and/or configuration queries on behalf of the communication device 106.

The management controller 110 can be implemented as a device that can be accessed as a USB function, which is a USB device that is able to transmit or receive data or control information over the USB. The USB host computer system 102 configures a USB function. Implementing the management controller 110 as a USB function enables host computer system 102's software to configure the management subsystem 108. Alternatively, the management subsystem 108 may be accessed by another, separate interface to the host computer system 102's processors, such as a set of input/output (I/O) ports.

The communication device 106 sends the communication data stream 302 to the management subsystem 108 via a comm port (communication port) 370. In one embodiment, the communication port 370 is a well-known serial port.

Figure 4:
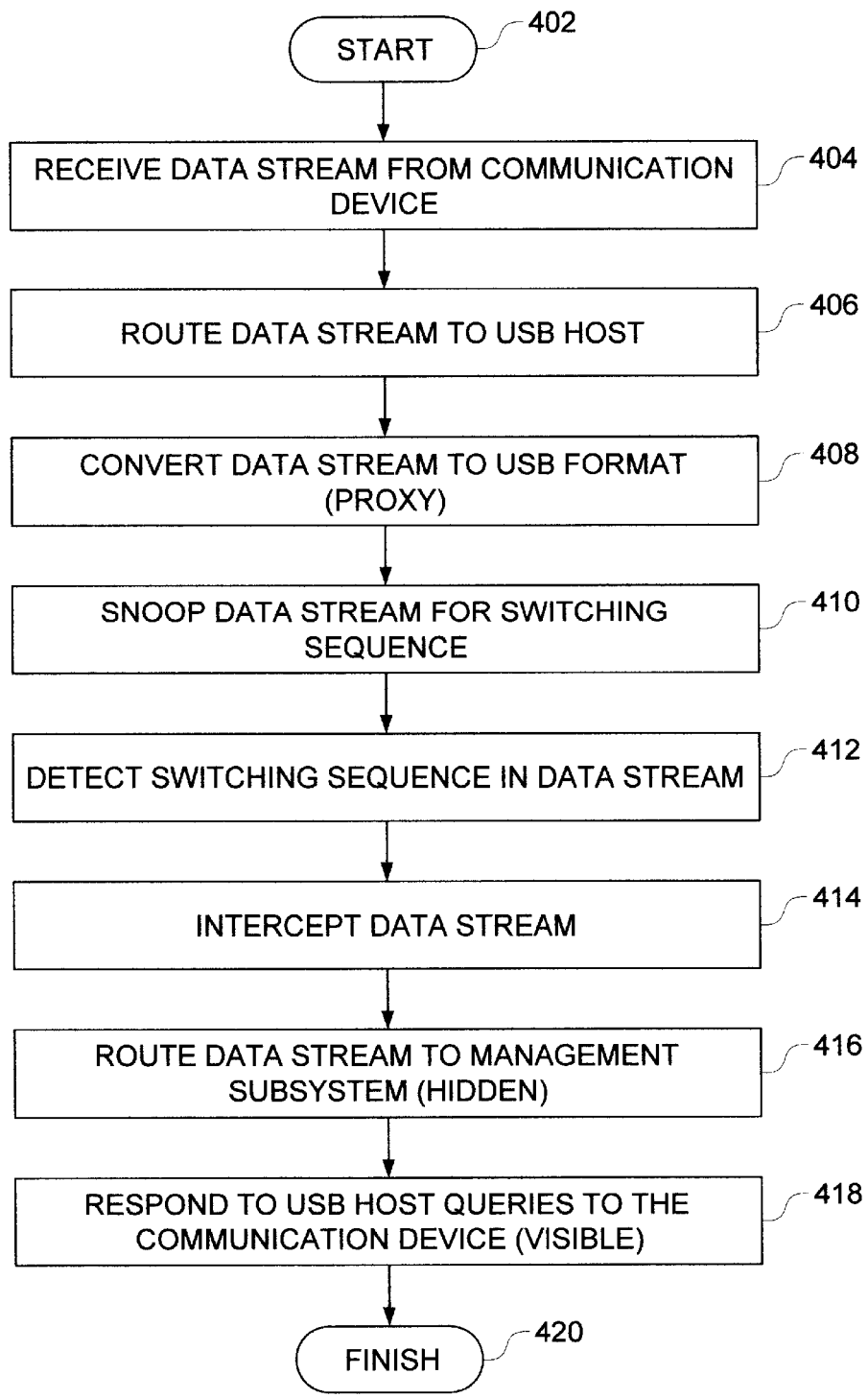
FIG. 4 is a flowchart of a method implementing aspects of the present invention.

FIG. 4 depicts a method 400 of an example approach to sharing the communication device 106 between management controller 110 and the host computer system 102. The method 400 begins with step 402, where control immediately passes to step 404.

In step 404, the management controller 110 receives the communication data stream 302 from the communication device 106. In step 406, the management controller 110 routes the communication data stream 302 to the host computer system 102. In step 406, the management controller 110 converts the communication data stream 302 to USB format.

In step 408, the management controller 110 snoops the communication data stream 302 for a switching sequence. In step 410, the management controller 110 detects a switching sequence in the communication data stream 302. In step 414, the management controller 110 intercepts the communication data stream 302. In step 416, the management controller 110 routes the communication data stream 302 to the management subsystem 108. In step 418, the management controller 110 responds to USB host queries sent to the communication device 106. In one embodiment, the management controller 110 responds to presence and/or configuration queries from the host computer system 102. The method 400 finishes in step 420. Steps 416 and 418 will typically occur in parallel with one another.

Figure 5:
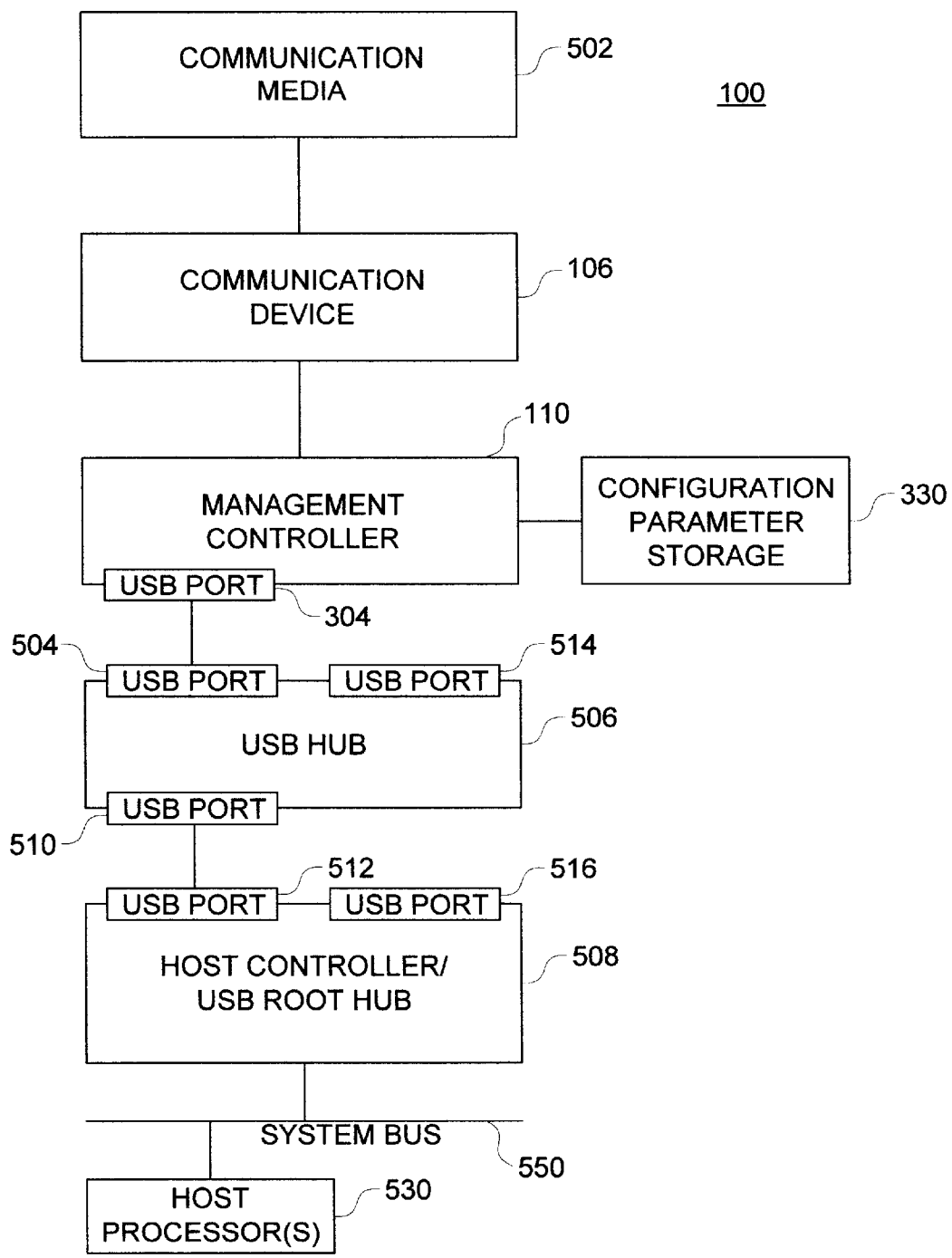
FIG. 5 is a block diagram of an alternative environment suitable for implement aspects of the present invention.

FIG. 5 is an alternative view of the environment 100, which includes a communication media 502 coupled to the communication device 106. The communication media 502 is any well-known media that transmits and receives communication, such as signals, data, voice, multimedia, streaming media, etc. For example, the communication media 202 may be optical fiber, cable, wire, etc., and connects to the remote computer system 104.

FIG. 5 also illustrates an embodiment where the communications device sharing and management controller functions are implemented as a standalone USB device attached to a USB port connected to the host computer system 102. In an alternative embodiment, the communications device sharing and management controller functions can be physically contained entirely within the main chassis for the host computer system 102. The communication device 106 is coupled to the management controller 110, which has its USB port 304 coupled to a USB port 504 on a USB hub 506. The USB hub 506 provides the electrical interface between the management controller 110 behaving as a USB device and a HOST controller/USB Root Hub 508.

According to the USB specifications, the USB Hub 506 provides the mechanism to allow more than one USB device to connect to a given USB port. The management controller 110's USB port 304 can be connected to the USB port 504 on the USB Hub 506, as shown in FIG. 5. Alternatively, the management controller 110's USB port 304 can be directly connected to a port, such as the USB port 512 on the Host Controller/USB Root Hub 508.

The HOST controller/USB Root Hub 508 has two portions: a host controller and a USB root hub. The host controller portion is any well-known USB host controller, which interfaces the host computer system 102 with USB devices. In one embodiment, the host controller portion of the HOST controller/USB Root Hub 508 interfaces the management controller 110 with the host processor 530.

The USB root hub portion is so named because it is the USB hub directly attached to a USB host controller. A USB port 510 connects to a USB port 512, which allows the USB hub 506 to be connected to the HOST controller/USB Root Hub 508. In one embodiment, the root hub portion is the USB interface 112.

There is a USB port 514, which allows a USB device to be connected to the USB hub 506. USB hubs typically support multiple USB ports. There also is a USB port 516, which represents port(s) that allow other USB device(s) to be connected to the HOST controller/USB Root Hub 508.

The HOST controller/USB Root Hub 508 is coupled to a host processor(s) 530 via a system bus 550. In one embodiment, the host controller portion of the HOST controller/USB Root Hub 508 interfaces the management controller 110 with the host processor 530.

The host processor(s) 530 are one or more processors that perform conventional functions of executing programming instructions, including implementing the teachings of the present invention. The host processor 530 can be a processor of the Pentium® family available from Intel Corporation of Santa Clara, Calif. The system bus 550 is any well-known bus that supports the host processors 530. After reading the description herein, a person of ordinary skill in the relevant art would be able to implement the present invention for a variety of operating systems.

Although embodiment(s) of the present invention are depicted as individual elements, functions, etc., it is to be understood that any, several, or all elements may be integrated into one or more integrated circuits, chips, etc. Moreover, aspects of the invention can be implemented using hardware, software, firmware, or a combination thereof. Such implementations include state machines, ASICs, field programmable gate arrays, (FPGA), etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:

a remote computer system;

a communication device coupled to the remote computer system; and a host computer coupled to the communication device, the host computer having a management subsystem and a Universal Serial Bus (USB) interface coupled to the management subsystem, the host computer to pass a data stream to the management subsystem, the management subsystem to prevent access to the communication device by the host computer and to permit access to the host computer by the remote computer system if the management subsystem detects a trigger in the data stream, the host computer to place the communication device on a USB device list and, the management subsystem to simulate the presence of the communication device to the host computer when access to the communication device by the host computer is prevented.

2. The apparatus of claim 1, further comprising logic coupled to receive the data stream from the communication device to convert the data stream to USB format.

3. The apparatus of claim 1, further comprising logic coupled to receive the data stream from the communication device and to monitor the data stream for a data sequence that the data stream is intended for the host computer or the management subsystem.

4. The apparatus of claim 1, further comprising logic coupled to receive the data stream from the communication device and to determine that the data stream is intended for a management subsystem and in response to route the data stream to the management subsystem.

5. The apparatus of claim 1, further comprising logic coupled to receive the data stream from the communication device to determine that the data stream is intended for the host computer and the management subsystem and in response to route the data stream between the host computer and the management subsystem.

6. The apparatus of claim 1, further comprising logic coupled to route the data stream to the host computer to send dummy data to the host computer to simulate a USB connection of the communication device.

7. A method, comprising:

routing a data stream from a communication device to a host computer;

converting the data stream to Universal Serial Bus (USB) format;

snooping the data stream for a trigger;

when the trigger is detected, rerouting the data stream to a management subsystem in the host computer, preventing access to the communication device by the host computer and permitting access to the host computer by a remote computer system; and responding to queries by the host computer for the communication device when rerouting the data stream to the management subsystem.

8. The method of claim 7, further comprising preventing access to the communication device by the host computer.

9. The method of claim 8, further comprising simulating the presence of the communication device to the host computer when access to the communication device by the host computer is prevented.

10. An apparatus, comprising:

a communication device to transmit a data stream;

a management subsystem to monitor the data stream;

route logic coupled to route the data stream between a Universal Serial Bus (USB) compatible host computer and the management subsystem; and snoop logic coupled to snoop the data stream for a trigger, the route logic coupled to prevent access to the communication device by the host computer, to permit access to the host computer by a remote computer system, and to route the data stream to the management subsystem if the trigger is detected, the management subsystem coupled to simulate the presence of the communication device to the host computer if the data stream is routed to the management subsystem.

11. The apparatus of claim 10, further comprising a converter coupled to convert the data stream to a Universal Serial Bus (USB) format.

* * * * *

UNITED STATES PATENT AND TRADEMARK OFFICE
CERTIFICATE OF CORRECTION

PATENT NO. : 6,772,253 B1
DATED : August 3, 2004
INVENTOR(S) : Slaight et al.

It is certified that error appears in the above-identified patent and that said Letters Patent is hereby corrected as shown below:

Column 2,
Line 4, delete "implement" and insert -- implementing --.

Column 6,
Line 32, delete "10" and insert -- 110 --.

Signed and Sealed this

Twelfth Day of October, 2004

JON W. DUDAS
*Director of the United States Patent and Trademark Office*